(12) United States Patent
Wijbrans et al.

(10) Patent No.: US 10,031,297 B2
(45) Date of Patent: Jul. 24, 2018

(54) OPTICAL FIBER CONNECTOR VALIDATION

(71) Applicant: KONINKLIJKE PHILIPS N.V., Eindhoven (NL)

(72) Inventors: Klass Cornelis Jan Wijbrans, Eindhoven (NL); Gerhardus Wilhelmus Lucassen, Eindhoven (NL); Bernardus Hendrikus Wilhelmus Hendriks, Eindhoven (NL); Christian Reich, Eindhoven (NL); Peter Douglas Fairley, Eindhoven (NL); Waltherus Cornelis Jozef Bierhoff, Eindhoven (NL); Johannes Antonius Van Rooij, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 97 days.

(21) Appl. No.: 15/102,594

(22) PCT Filed: Nov. 25, 2014

(86) PCT No.: PCT/EP2014/075517
§ 371 (c)(1),
(2) Date: Jun. 8, 2016

(87) PCT Pub. No.: WO2015/086308
PCT Pub. Date: Jun. 18, 2015

(65) Prior Publication Data
US 2016/0313513 A1    Oct. 27, 2016

(30) Foreign Application Priority Data

Dec. 9, 2013  (EP) .................................. 13196252
Aug. 28, 2014 (EP) .................................. 14182587

(51) Int. Cl.
G02B 6/38   (2006.01)
G02B 6/32   (2006.01)
G02B 6/42   (2006.01)

(52) U.S. Cl.
CPC ............. *G02B 6/3845* (2013.01); *G02B 6/32* (2013.01); *G02B 6/3825* (2013.01);
(Continued)

(58) Field of Classification Search
None
See application file for complete search history.

(56) References Cited

U.S. PATENT DOCUMENTS 4,783,137 A   11/1988  Kosman
5,002,812 A    3/1991  Umehara
(Continued)

FOREIGN PATENT DOCUMENTS

EP   0417507 A1   3/1991
EP   0430107 A2   6/1991
(Continued)

OTHER PUBLICATIONS

Nachabe, B. et al "Estimation of Lipid and Water Concentrations in Scattering Media with Diffuse Optical Spectroscopy from 900 to 1600 nm", Journal of Biomedical Optics, vol. 15, 2010.
(Continued)

*Primary Examiner* — Uyen Chau N Le
*Assistant Examiner* — Chad H Smith (57) ABSTRACT

The present invention relates to an optical fiber connector that finds application in the general field of optical interconnection. The optical fiber connector (1a, 1b, *c*) includes a body (2) having a bore (3) configured to receive an optical fiber; an alignment sleeve (4) that is arranged coaxially with the bore (3); an optical fiber (5) having an end face (6); wherein the optical fiber (5) is arranged within the bore (3).

(Continued)

At least at the end face (6) the optical fiber connector includes an optical signature component (50, 51, 52) having a predetermined optical signature.

15 Claims, 8 Drawing Sheets

(52) U.S. Cl.
CPC ......... *G02B 6/3874* (2013.01); *G02B 6/3895* (2013.01); *G02B 6/4291* (2013.01)

(56) References Cited

U.S. PATENT DOCUMENTS

| | | |
|---|---|---|
| 5,210,815 A | 5/1993 | Alexander |
| 6,282,347 B1 | 8/2001 | Ono |
| 2003/0165297 A1 | 9/2003 | Dultz |
| 2004/0146254 A1 | 7/2004 | Morrison |
| 2006/0045409 A1 | 3/2006 | Tatum |
| 2007/0292087 A1 | 12/2007 | Brown |
| 2007/0292987 A1 | 12/2007 | Yoon |
| 2010/0008676 A1 | 1/2010 | Kojima |
| 2012/0057829 A1 | 3/2012 | Benjamin |
| 2013/0216186 A1 | 8/2013 | Ott |
| 2013/0322821 A1 | 12/2013 | Grinderslev |

FOREIGN PATENT DOCUMENTS

| | | |
|---|---|---|
| EP | 1020742 A2 | 7/2000 |
| GB | 2397392 A | 7/2004 |
| JP | S61228405 A | 10/1986 |
| WO | 2008024604 A2 | 2/2008 |
| WO | 2011047111 A1 | 4/2011 |

OTHER PUBLICATIONS

Farrell, Thomas J. et al "A Diffusion Theory Model of Spatially Resolved, Steady-State Diffuse Reflectance for the Noninvasive Determination of Tissue Optical Properties in vivo", Med. Phys. vol. 19, No. 4, 1992.

OPTICAL FIBER CONNECTOR VALIDATION

CROSS-REFERENCE TO PRIOR APPLICATIONS

This application is the U.S. National Phase application under 35 U.S.C. § 371 of International Application No. PCT/EP2014/075517, filed on Nov. 25, 2014, which claims the benefit of European Patent Application No. 13196252.4, filed on Dec. 9, 2013 and European Patent Application No. 14182587.7, filed on Aug. 28, 2014. These applications are hereby incorporated by reference herein.

FIELD OF THE INVENTION

The present invention relates to an optical fiber connector for interconnecting optical fibers. An optical fiber connector assembly and housing that include the optical fiber connector are also described. A method of manufacture of the optical fiber connector is also described. The invention finds application in the general field of optical connectors, and more particularly finds exemplary use in optically interfacing a tissue-sensing optical needle with a spectrophotometer device in the medical field.

BACKGROUND OF THE INVENTION

Optical fibers connectors are used to terminate optical fibers. An optical fiber connector and a complementary optical fiber connector may be used to mechanically retain two optical fibers such that light carried by one optical fiber may couple into the other fiber to form a light-transmitting path between the optical fibers. A multitude of optical fiber connector types have been developed over the years for specific purposes. The well-known FC-type optical fiber connector for example offers high alignment accuracy with up to 500 mating cycles and finds application in the telecommunications field where a small misalignment between the optical fiber cores results in significant optical insertion losses. Other, lower cost optical fibers have also been developed. At least two categories of optical fiber connectors include physical-contact connectors and expanded-beam connectors. Physical contact connectors operate by bringing the cores of the two optical fibers that are to be interconnected into physical contact, and variously suffer from the need for high alignment tolerance and degraded lifetime after successive mating cycles. Expanded beam connectors such as disclosed in patent application WO2008/024604A2 typically include a lens at the face of each of the two optical fibers to expand the optical beam such that the interface between the two connectors occurs within the expanded beam region via an air gap. The expanded beam minimizes the impact of misalignment on the insertion loss of the connector, and the airgap alleviates the mechanical wear associated with physical contact connectors, thereby reducing the impact of trapped dust particles on the optical fiber end faces and improving the number of mating cycles.

The constraints of high mating cycles and low insertion losses placed upon conventional optical fiber connectors however typically increase the cost of optical fiber connectors. High connector costs may prohibit the use of such connectors in applications such as the medical field where optical fiber connectors may form part of a disposable device. In one exemplary application a so-called photonic needle disclosed in document "Estimation of lipid and water concentrations in scattering media with diffuse optical spectroscopy from 900 to 1600 nm", J. Biomed. Opt. 15, 037015 (2010) by R. Nachabé, B. H. W. Hendriks, A. E. Desjardins, M. van der Voort, M. B. van der Mark, and H. J. C. M. Sterenborg", uses optical fibers to deliver light and perform spectral sensing measurements at the tip of a needle in order to analyze tissue that is in contact with the needle tip. Owing to the complexities of sterilization, the needle device is typically discarded after a single use. Consequently a need has arisen for low cost optical fiber connectors for use in disposable optical device applications.

Furthermore, the ability to connect a multitude of optical components to optical fiber connectors has generated a need to determine whether a particular connector, and thus optical component, is connected to an optical system. In a particular example of the photonic needle in the medical field, there is a need to determine whether an approved optical fiber connector, and thus an approved photonic needle, is connected to an optical measurement console. The interconnection of such an optical sensing device with a non-approved connector may result in inaccurate or unreliable results. Consequently a need has arisen for the ability to verify whether an approved optical fiber connector is connected in the optical path of an optical fiber. Such may also find application in the general field of optical fibers. Conventional solutions to this issue include the development of bespoke connector shapes to ensure that an optical system can only be mated with an approved connector type.

SUMMARY OF THE INVENTION

It is an object of the invention to provide an optical fiber connector that may be used to couple light between two optical fibers. Another object of the invention is to provide a connector whose identity can be verified. Another object of the invention is to provide a connector whose identity can be verified as being a particular connector type from a predetermined number of connector types. Another object of the invention is to provide an optical fiber connector with improved optical transfer characteristics. Another object of the invention is to provide an optical fiber connector with relaxed alignment tolerance. Another object of the invention is to provide a low cost optical fiber connector. Another object of the invention is to provide an optical fiber connector which facilitates the confirmation of the identity of a corresponding optical fiber. Other objects of the invention include provision of a simplified manufacturing process for an optical fiber connector.

According to one aspect of the invention an optical fiber connector comprises a body having a bore configured to receive an optical fiber; an optional alignment sleeve that is arranged coaxially with the bore; an optical fiber having an end face; wherein the optical fiber is arranged within the bore; and wherein at least at the end face the optical fiber connector includes an optical signature component having a predetermined optical signature. The optical signature component may for example be a dye, a fluorescent dye, or a reflective layer having predetermined reflectivity. Alternatively the optical signature component may be a reflective layer that is disposed either on the end face of the optical fiber or at the end face of the optical fiber and beyond the radial extent of the optical fiber.

The predetermined optical signature allows the optical interrogation of the identity of the connector. Advantageously this may be carried out using the core of the optical fiber that is connected to the optical fiber connector, therefore in the absence of additional communication circuitry. Preferably the predetermined optical signature has a spectral component that lies beyond the wavelengths of light that are routinely carried by the optical fiber, allowing intermittent polling of the optical signature component and avoiding that the optical signature component interferes with wavelength of light that are routinely carried by the optical fiber.

The optional alignment sleeve operates to improve alignment of the optical fiber connector with a corresponding optical fiber connector. In one configuration there is no optical alignment sleeve. In this configuration, verification of the connector type may be achieved for example by using the core of the optical fiber in the bore to carry light from a light source to the optical signature component, and by using the same optical fiber bore to collect light returning from the optical signature component, by means of which the connector type verification is achieved, and to carry the returning light back towards the light source. Thus, verification of the connector type may be achieved for a single optical fiber connector via its own optical fiber. Alternatively, such interrogation of the optical signature component may also be achieved by connecting the optical fiber to a corresponding optical fiber, or to a corresponding optical fiber connector, wherein the identity of the optical fiber connector is established by supplying light to the optical signature component in the optical fiber connector using light carried supplied from and by collecting light with the optical fiber core of the optical fiber in the corresponding optical fiber connector. In another configuration an alignment sleeve is arranged coaxially with the bore for improving the alignment of an optical fiber within the bore. In another configuration the optical fiber connector has an axis and an alignment sleeve is arranged coaxially with the optical fiber connector axis. The latter configuration allows, for example, for the alignment of optical fiber connectors where the connector has an axis that is not aligned with the bore, and, for example, for the alignment of optical fiber connectors wherein each optical fiber connector has more than one optical fiber, or more than one bore. Other alignment features such as alignment pins, alignment notches or alignment groves may alternatively or additionally be used to improve alignment of the optical fiber connector with a corresponding optical fiber connector.

Other aspects of the invention are described in the claims and associated Figures.

DETAILED DESCRIPTION OF THE INVENTION

The following description of an optical fiber connector makes reference to its use in the medical field. Particular reference is made to its use in low cost disposable connector applications, however it is to be further appreciated that the invention also finds application in the interconnection of optical fibers in the general optical fiber application field.

It is an object of the invention to provide an optical fiber connector that may be used to couple light between two optical fibers. Another object of the invention is to provide a connector whose identity can be verified. Another object of the invention is to provide a connector whose identity can be verified as being a particular connector type from a predetermined number of connector types. Another object of the invention is to provide an optical fiber connector with improved optical transfer characteristics. Another object of the invention is to provide an optical fiber connector with relaxed alignment tolerance. Another object of the invention is to provide a low cost optical fiber connector. Another object of the invention is to provide an optical fiber connector which facilitates the confirmation of the identity of a corresponding optical fiber. Other objects of the invention include provision of a simplified manufacturing process for an optical fiber connector.

According to one aspect of the invention an optical fiber connector comprises a body having a bore configured to receive an optical fiber; an optional alignment sleeve that is arranged coaxially with the bore; an optical fiber having an end face; wherein the optical fiber is arranged within the bore; and wherein at least at the end face the optical fiber connector includes an optical signature component having a predetermined optical signature. The optical signature component may for example be a dye, a fluorescent dye, or a reflective layer having predetermined reflectivity. The dye may be included within a polymer layer or deposited on the surface of the optical fiber. The optical signature component may form a layer around the optical fiber, and may for example be a polymer layer within which the dye is dispersed. Optionally the buffer layer of the optical fiber may be present at the tip of the optical fiber, or alternatively this may be absent. Alternatively the optical signature component may be a reflective layer that is disposed either on the end face of the optical fiber or at the end face of the optical fiber and beyond the radial extent of the optical fiber.

The predetermined optical signature allows the optical interrogation of the identity of the connector. Advantageously this may be carried out using the core of the optical fiber that is connected to the optical fiber connector, therefore in the absence of additional communication circuitry. Light from the core of the optical fiber reaches the optical signature component, either directly from the core, or by means of stray light outside the core that exits the optical fiber at its end face. In some configurations the amount of stray light reaching the optical signature component is increased when a connector is mated to the connector of the present invention, for example due to misalignment of the cores of two so-connected optical fibers. An optical light source and spectrophotometer or optical detector sensitive to the spectral signature may be in optical communication with the optical fiber connector in order to perform the desired optical interrogation, such components being conventionally found within the optical path of an optical fiber. In one example the optical signature component is a polymer layer that surrounds the optical fiber; wherein the polymer layer includes a dye. The dye may for example be a colored dye having a reflectance that may be recognized by irradiating the dye with light that passes along the core of the optical fiber and subsequently detecting the backscattered, reflected or fluorescent emission of the dye by means of the optical fiber and an optical detector coupled thereto. The dye may be a fluorescent dye, the excitation of which causes the emission of a predetermined optical signature which is the range of spectral emission wavelengths of the fluorescent dye. In one example the dye may be excited by ultraviolet (uv) irradiation and has visible emission wavelengths. Such may be used to prevent continuous excitation of the fluorescent dye when the optical fiber routinely carries visible light wavelengths, and wherein a pulse of uv light may be used intermittently to confirm the identity of the connector. In another example the dye may be excited by uv irradiation and has infrared emission wavelengths. In another example the layer disposed at the end face of the optical fiber is disposed on the end face in the form of a layer that has a spectral reflectance that is characteristic of a particular connector type. The layer may for example be a multilayer coating having a predetermined reflectance characteristic. In another example a fiber bragg grating (FBG) having a predetermined optical reflectance characteristic may be written along the length of the optical fiber in the proximity of the optical connector. In another example the layer disposed at the end face of the optical fiber and beyond the radial extent of the optical fiber. Such a layer may therefore have the form of a washer disposed around the optical fiber. The layer may be disposed on a portion of the body surrounding the optical fiber. Advantageously the washer configuration permits the optical interrogation of the optical fiber by means of stray light escaping the core of the optical fiber at the connector that arises from an inherent misalignment of the cores of two optical fibers that are interconnected by the connector. In so doing the identity of the connector may be validated without the need to deposit such a layer on the surface of the optical fiber, which might adversely affect its optical transmission characteristics. The amount of stray light may be deliberately increased by providing an airgap between the end faces of two optical fibers. Desirably the spectral signature emission wavelengths have spectral bands that do not overlap with the light carried by the optical fiber. In so doing the identity of the optical connector may be interrogated without interference with wavelengths of light that are routinely carried by the optical fiber.

According to another aspect of the invention the optical fiber connector includes a positive lens that is arranged within the alignment sleeve. The positive lens operates to collimate light from the optical fiber. Preferably the focal point of the positive lens is at the end face of the optical fiber. Such collimation means is advantageous in optical sensing applications wherein collimation of the beam emerging from the optical fiber improves the directivity of an optical beam delivered by the optical fiber, or the directivity of its sensitivity. When the optical fiber connector is mated with a second optical fiber connector also having such a positive lens, light is communicated between the cores to the optical fibers in each connector. Reduced sensitivity to misalignment errors is achieved by such a configuration because the mating between the two connectors occurs at a wide point in the optical beam, thereby reducing the optical coupling loss between the two optical fibers. In another arrangement the end face of the optical fiber is defocused respective the positive lens. In this configuration a more relaxed alignment tolerance between the optical fiber core and the positive lens can be achieved at the expense of a higher connector insertion loss.

According to another aspect of the invention there is an air gap between the end face of the optical fiber and the positive lens. Such an air gap advantageously reduces wear between the lens and the optical fiber during temperature fluctuations that affect the dimensions of the optical fiber connector. Such an air gap may be used to accommodate the focal length of the positive lens.

According to another aspect of the invention the positive lens is in contact with the end face of the optical fiber. Such a configuration provides more repeatable collimation characteristics because by the collimation of the positive lens is not affected by variations in the gap between the positive lens and the end face of the optical fiber during assembly.

According to another aspect of the invention the end face of the optical fiber and positive lens are separated by a region of optical index matching material having a refractive index within 10% of the refractive index of either the core of the optical fiber or of the positive lens. The optical index matching material may be a liquid, an adhesive or a gel or an optical grease, for example. Such optical index matching reduces the optical coupling loss of the connector.

According to another aspect of the invention the alignment sleeve of the optical connector extends coaxially with the bore beyond the axial extent of the end face of the optical fiber in a direction away from the optical fiber. Such a configuration protects the end face of the optical fiber, reducing its susceptibility to wear and the collection of debris which may affect the optical performance of the optical fiber connector.

According to another aspect of the invention the optical fiber connector includes a positive lens and the alignment sleeve extends coaxially with the bore beyond the axial extent of the positive lens in a direction away from the optical fiber. Such a configuration protects the outermost face of the positive lens, reducing its susceptibility to wear and the collection of debris which may affect the optical performance of the optical fiber connector.

According to another aspect of the invention the optical fiber connector further includes a stop flange. The stop flange operates to set the distance between the end faces of the cores of two corresponding optical fibers in optical communication with each other. Consequently more repeatable optical transfer characteristics between the two optical fibers may be achieved.

According to another aspect of the invention the alignment sleeve is tapered. Such a configuration assists in the mating of one optical fiber connector with another optical fiber connector.

According to another aspect of the invention for at least a portion of the axial extent of the bore the buffer layer is removed. For that portion either the cladding layer is in optical contact with the body via an optical medium having a real part of refractive index that is greater than or equal to the refractive index of the cladding layer; or the cladding layer is in contact with the body and the body is formed from a material having a real part of refractive index that is greater than or equal to the refractive index of the cladding layer. Such a configuration operates as a cladding mode stripper, causing light that is transported along the length of the optical fiber by the cladding, to leak into the body of the connector, or into the optical medium. Any misalignment of the cores of the optical fibers that are in communication by means of two mated optical fiber connectors results in additional light being carried by the cladding layer, or so-called cladding modes. Variations in the core diameter of two such optical fibers also result in such cladding modes. Such modes generally diminish after about 10 meters of optical fiber as they are poorly guided. However, when short optical fiber lengths in the order of a few meters or less are used with optical fiber connectors, their length is inadequate for the cladding modes to diminish. Consequently the use of short optical fibers with optical connectors can result in significant power in the cladding. In for example tissue sensing optical spectroscopy applications which deliver light from the tip of an optical fiber the cladding modes may deliver unwanted, poorly directed optical radiation into the tissue that is sensed, confounding measurements. Consequently the use of this configuration as a cladding mode stripper within the optical fiber connector improves the repeatability of the optical transfer characteristics of the optical fibers, thereby improving the quality of the optical spectroscopy measurements. The optical medium used in stripping the cladding modes may for example be an adhesive layer or a gel layer or an optical grease layer; and/or the body may formed from polyimide; these materials meeting the desired refractive index criteria. The optical medium or the polyimide may further include a plurality of scattering centers having a volume diameter in the range of 0.1 to 1.0 microns. The density of such centers may exceed 1000 per $cm^3$, such a diameter and density being favorable to the scattering of optical wavelengths and thereby improving the attenuation of the cladding modes.

A further effect of the removal of the buffer layer for at least a portion of the axial extent of the bore, and of the resulting optical contact between the cladding layer and the optical signature component via an optical medium having a refractive index that is greater than or equal to the refractive index of the cladding layer, will be understood to be an increase in the amount of light that leaks-away from the optical fiber cladding and which reaches the optical signature component. This increase in light leakage from the cladding improves the signal to noise ratio of the signal returned by the optical signature component. This improves the integrity of the optical interrogation of the optical signature component.

The conventional fabrication process of an optical fiber typically provides an optical fiber having a core that is surrounded by a cladding layer, the cladding layer being surrounded by a buffer layer. According to the invention, for at least a portion of the axial extent of the connector bore in which the optical fiber is arranged, the buffer layer is absent, or removed, or interrupted, in the sense that it is not present. Consequently the optical fiber has a core surrounded by a cladding layer wherein the cladding layer is at least partially, thus for a portion of the axial extent of the optical fiber, surrounded by a buffer layer, and wherein for at least a portion of the axial extent of the bore in which the optical fiber is arranged, the buffer layer is removed, or absent, or interrupted. Preferably the buffer layer is removed from, or absent from the entire circumference of the optical fiber, although satisfactory performance is also achieved if the buffer is removed, or absent from a portion of the circumference of the optical fiber. The buffer may be removed using conventional methods such as a mechanical stripping tool, a solvent such as dichloromethane, hot sulphuric acid, or for example by heating such as in a flame or using a laser.

The aforementioned aspects of the optical fiber connector may in isolation or in any selected combination be used in an optical fiber connector assembly, and in an optical fiber connector housing.

According to another aspect of the invention an optical fiber connector assembly is disclosed which comprises a first optical fiber connector that is mated with a corresponding second optical fiber connector. Such a configuration may be used to communicate light between the cores of the optical fibers within the two optical fiber connectors. This may be achieved by for example by arranging that the alignment sleeve of the first optical fiber connector has an outer diameter that is configured to fit within the inner diameter of the counterpart alignment sleeve of the second optical fiber connector, and vice versa. Other mating configurations are also possible.

According to another aspect of the invention an optical fiber connector assembly comprising a first optical fiber connector and a second optical fiber connector is disclosed wherein the optical fiber of the first optical fiber connector has a core diameter D1 and a Numerical Aperture NA1; and wherein its counterpart optical fiber in the second optical fiber connector has a core diameter D2 and a Numerical Aperture NA2; wherein at least one of the ratio (D1/D2) or the ratio (NA1/NA2) either exceeds 1.1 or is less than 1.1.

In another configuration at least one of the ratio (D1/D2) or the ratio (NA1/NA2) either exceeds 1.5 or is less than 0.5. A conventional specification for the Numerical Aperture of an optical fiber that is not covered by these ranges is 0.37+/−0.02; this conventional range being desirably minimized in order to reduce optical coupling loss between optical fibers. The use of optical fibers having differing core diameter and/or differing numerical aperture optical fiber connector assembly relaxes the alignment tolerance requirements of the cores of the optical fibers. This consequently permits the use of simpler, cheaper processes for manufacturing the connector. For example, light guided from a large core diameter fiber to a smaller core diameter fiber by the optical fiber connector assembly results in a relaxed alignment tolerance requirement at the expense of increased insertion loss. In optical sensing applications where optical source power is plentiful, such a configuration can be used to ensure that adequate light is communicated between the two optical fiber cores. The efficiency of light transfer between two optical fibers may be improved using the optical fiber connector assembly by transmitting light from a narrow core diameter optical fiber via the optical fiber connector assembly to a wider core diameter optical fiber. Any misalignment of the cores of the two optical fibers results in a reduced insertion loss as compared to the use of core diameters having substantially the same size owing to the wider core diameter of the light-receiving optical fiber. In one contemplated optical spectroscopy application that uses the optical fiber connector assembly, light is delivered by a wide core optical fiber, via the optical fiber connector to an optical sensing site at the distal end of needle via a narrow core optical fiber. Light scattered by the sensing site is collected via a separate optical path comprising a second narrow core optical fiber that transmits the collected light to a detector via a second optical fiber connector and a wider core diameter optical fiber. The low insertion loss of the first optical connector is mitigated by the availability of high optical source power, whilst in the detection path, low insertion loss is provided by the narrow to wide core transition in spite of misalignment of the cores. Consequently in such an optical fiber connector assembly, low cost narrow diameter optical fibers that fit within the bore of the optical sensing needle are provided with a cheaper connector having a degraded alignment tolerance requirement.

According to another aspect of the invention an optical fiber connector assembly (935) is disclosed in which the end faces of the two optical fibers configured for optical communication are in physical contact. Such physical contact reduces the insertion loss of the optical connector and removes the insertion loss variability on the separation between their end faces.

According to another aspect of the invention an optical fiber connector assembly comprises two mated optical fiber connectors wherein the alignment sleeve of each optical fiber connector has a radial stop flange. The axial position of the radial stop flange and the stop flange of each optical fiber connector respective the axis of the bore within the body of each connector determines the relative separation of the end faces of the cores of an optical fiber and a counterpart optical fiber. By setting the relative separation of the end faces with the stop flange and the radial stop flange, accurate optical insertion loss of the connector can be achieved.

According to another aspect of the invention an optical fiber connector assembly comprises two mated optical fiber connectors wherein the stop flange and the radial stop flange are configured to leave a gap between the end faces of the cores of two optical fibers. Optionally the gap may be filled with a gel layer or an optical grease layer having a refractive index within 10% of the refractive index of the core (907, 924) of at least one of the two optical fibers in order to reduce the insertion loss of the connector.

According to another aspect of the invention an optical fiber connector assembly comprises a first optical fiber connector and a second optical fiber connector, wherein each optical fiber connector further includes a positive lens within its alignment sleeve. Each positive lens may be arranged respective the end face of its optical fiber to perform collimation of light carried by that optical fiber. Advantageously the combined effect of the two positive lenses is to reduce the susceptibility of the optical connector to insertion losses caused by misalignment of the cores of their optical fibers.

According to another aspect of the invention an optical fiber connector assembly comprises a first optical fiber connector and a second optical fiber connector wherein each of the alignment sleeve of the first optical fiber connector and the corresponding counterpart alignment sleeve of the second optical fiber connector has a cross section in a plane that is perpendicular to its bore that is non-rotationally symmetric about its bore. Such a configuration prevents mating the first optical fiber connector and a second optical fiber connector with an undesirable axial rotational configuration. This aspect of the invention finds further application when two or more optical fiber connector assemblies are combined together in an optical fiber connector housing and ensures that mating can only occur between each first optical fiber connector and its corresponding second optical fiber connector in one configuration.

According to another aspect of the invention an optical fiber connector housing comprises two or more optical fiber connector assemblies; wherein every first optical fiber connector is retained within a plug housing, and wherein every second optical fiber connector is retained within a socket housing. One of the optical fiber connector assemblies has an optical fiber with a core diameter D1 and a Numerical Aperture NA1 and a counterpart optical fiber with a core diameter D2 and a Numerical Aperture NA2. The second and further optical fiber connector assemblies each have an optical fiber with a core diameter D3 and a Numerical Aperture NA3 and a counterpart optical fiber with a core diameter D4 and a Numerical Aperture NA4; wherein at least one of the ratio (D1/D2) or the ratio (NA1/NA2) either exceeds 1.1 or is less than 1.1; and wherein at least one of the ratio (D3/D4) or the ratio (NA3/NA4) lies within the range 0.9 to 1.1. Such a configuration has been found to be particularly useful in minimizing the sensitivity of the cores of the optical fibers in the connector to misalignment errors. This has been found to be particularly useful in an optical spectroscopy application that includes an optical sensing needle.

According to another aspect of the invention an optical fiber connector housing is disclosed wherein at least a portion of the body surrounding each counterpart optical fiber in the socket housing is elastically coupled to the socket housing for providing an elastic force along the axis of the counterpart optical fiber in the direction away from the end face of the counterpart optical fiber and wherein each optical fiber in the plug housing is rigidly mechanically coupled to the plug housing. The elastic coupling may be for example a metal or plastic spring or a compressible metal or plastic arm or member anchored between the body and the socket housing to act as an elastic coupling. The elastic coupling provides elasticity along the axis of the counterpart optical fiber such that when the counterpart optical fiber connector in the socket housing is mated with the corresponding optical fiber connector in the plug housing the end face of the counterpart optical fiber is elastically held against the corresponding end face of the optical fiber in the corresponding plug housing. The elastic coupling improves the light coupling between the cores of the two optical fibers, thereby reducing the sensitivity to manufacturing tolerances of the optical fiber connector along the axis of the optical fiber bore.

According to another aspect of the invention an optical fiber connector housing comprises an alignment feature having a male portion and a corresponding female portion. The male portion of the alignment feature is a protrusion that is fixably mounted to an alignment sleeve of the first optical fiber connector in the plug housing; and the female portion of the alignment feature is a groove that corresponds with the protrusion and which is fixably mounted to a counterpart alignment sleeve of a corresponding second optical fiber connector in the socket housing. The male portion and the female portion are configured such that they are coincident when the two or more optical fiber connector assemblies are mated. Such an alignment feature ensures that the first optical fiber connector in the plug housing can only be mated with the second optical fiber connector in the socket housing in one orientation.

According to another aspect of the invention an optical fiber connector assembly or an optical fiber connector housing further includes a locking mechanism for temporarily fixing the relative axial positions of at least the optical fiber and the counterpart optical fiber; wherein a male portion of the locking mechanism is fixably attached to a first optical fiber connector and wherein a corresponding female portion of the locking mechanism is fixably attached to a second optical fiber connector and wherein the male portion of the locking mechanism and the female portion of the locking mechanism are in a locked state when the optical fiber and the counterpart optical fiber are mated; and wherein the locking mechanism is selected from the group: a screw connector, a twist-lock connector, a snap connector, a bayonet connector.

According to another aspect of the invention a medical optical spectroscopy device includes the optical fiber connector or the optical fiber connector assembly. Such can be used in the medical optical spectroscopy device to improve the susceptibility to misalignment tolerances of temporarily connected optical fibers. The optical spectroscopy device may for example be a so-called photonic needle optical spectroscopy device configured for supplying and measuring optical signals relating to tissue at the tip of a needle.

According to another aspect of the invention the use of the optical fiber connector in a medical optical spectroscopy device is disclosed. The medical optical spectroscopy device may for example be a so-called photonic needle optical spectroscopy device configured for supplying and measuring optical signals relating to tissue at the tip of a needle.

The body of the optical fiber connector may for example be formed from a plastic, including for example Nylon, HDPE, Polystyrene, Polycarbonate, polyamide, ABS.

The alignment sleeve of the optical fiber connector may for example be formed from a plastic, including for example Nylon, HDPE, Polystyrene, Polycarbonate, polyamide, ABS or from a metal.

The positive lens used in the optical fiber connector, which may be a ball lens as illustrated in the Figures or alternatively any positive lens including a plano-convex lens, a bi-convex lens or a Fresnel lens may for example be formed from a glass or a polymer.

The present invention is now described with reference to a number of Examples that are enumerated to illustrate the interdependence of their features.

$1^{st}$ EXAMPLE

Figure 1A:
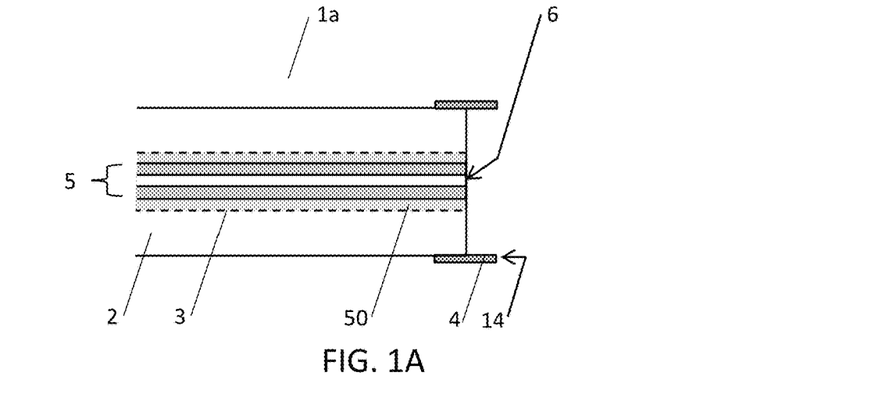
FIG. 1A illustrates an optical fiber connector (1) according to the present invention having an optical signature component (50) that is a layer that surrounds the optical fiber
Figure 1B:
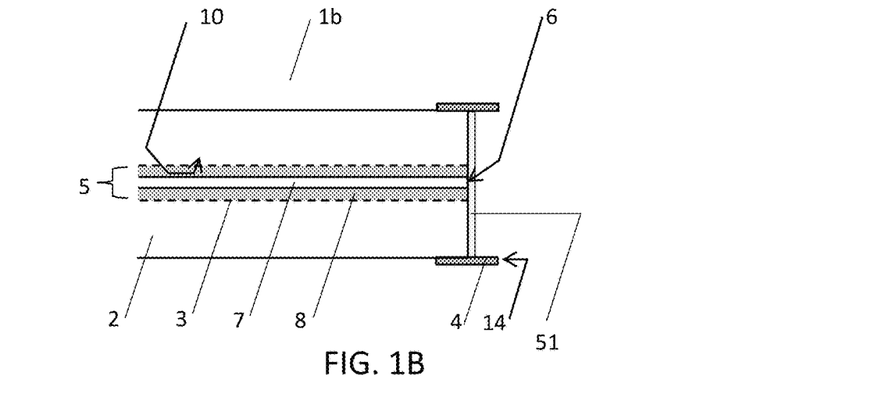
FIG. 1B illustrates an optical fiber connector (1) according to the present invention having an optical signature component (51) that is a layer that is disposed on the end face of the optical fiber.
Figure 1C:
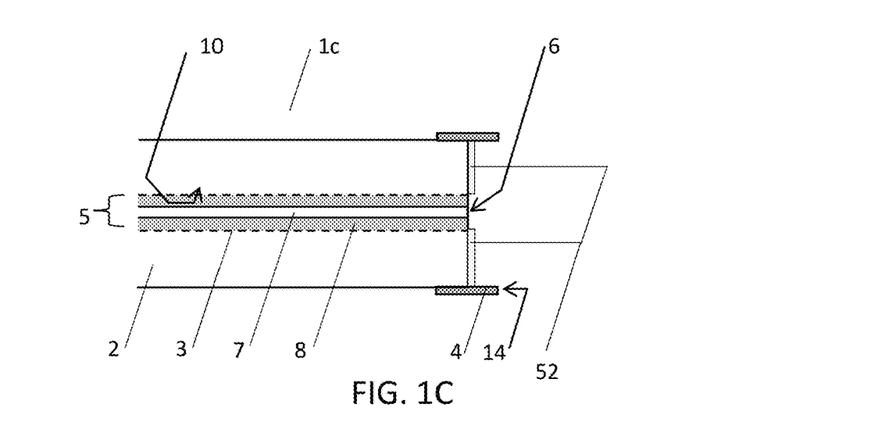
FIG. 1C illustrates an optical fiber connector (1) according to the present invention having an optical signature component (52) that is a layer that is disposed at the end face of the optical fiber and beyond the radial extent of the optical fiber.

1. An optical fiber connector (1) comprising:
a body (2) having a bore (3) configured to receive an optical fiber;
an alignment sleeve (4) that is arranged coaxially with the bore (3);
an optical fiber (5) having an end face (6);
wherein the optical fiber (5) is arranged within the bore (3); and
wherein at least at the end face (6) the optical fiber connector includes an optical signature component having a predetermined optical signature.

$2^{nd}$ EXAMPLE

2. An optical fiber connector according to Example 1 wherein the optical signature component is a polymer layer that surrounds the optical fiber; wherein the polymer layer includes a dye.

$3^{rd}$ EXAMPLE

3. An optical fiber connector according to Example 2 wherein the dye is a fluorescent dye and the predetermined optical signature is the optical emission spectrum of the fluorescent dye.

$4^{th}$ EXAMPLE

4. An optical fiber connector according to Example 3 wherein the dye is a fluorescent dye is a uv-excitable dye having optical emission at visible wavelengths.

$5^{th}$ EXAMPLE

5. An optical fiber connector according to Example 2 wherein the predetermined optical signature is the spectral reflectance of the dye.

$6^{th}$ EXAMPLE

6. An optical fiber connector according to Example 2 wherein the spectral reflectance of the dye has a peak reflectance within at least a portion of the visible spectrum that is greater than 10%.

$7^{th}$ EXAMPLE

7. An optical fiber connector according to Example 1 wherein the optical signature component is an optically reflective layer disposed either on the end face of the optical fiber or at the end face of the optical fiber and beyond the radial extent of the optical fiber and the predetermined optical signature is a reflectivity within at least a portion of the visible spectrum of greater than 10%.

$8^{th}$ EXAMPLE

Figure 2:
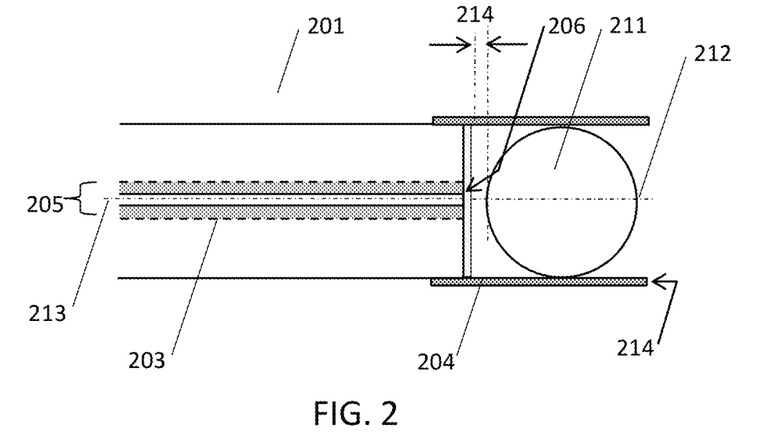
FIG. 2 illustrates an optical fiber connector (201) having a positive lens (211) wherein there is a gap (214) between the end face of the optical fiber and the positive lens.

8. An optical fiber connector (201) according to Example 1 further comprising a positive lens (211) having an optical axis (212); wherein the positive lens (211) is arranged within the alignment sleeve (204) and wherein the optical axis of the positive lens (212) is aligned coaxially with the axis (213) of the bore (203).

9th EXAMPLE

9. An optical fiber connector (201) according to Example 8 wherein there is an air gap (214) between the end face (206) of the optical fiber (205) and the positive lens (211).

10th EXAMPLE

Figure 3:
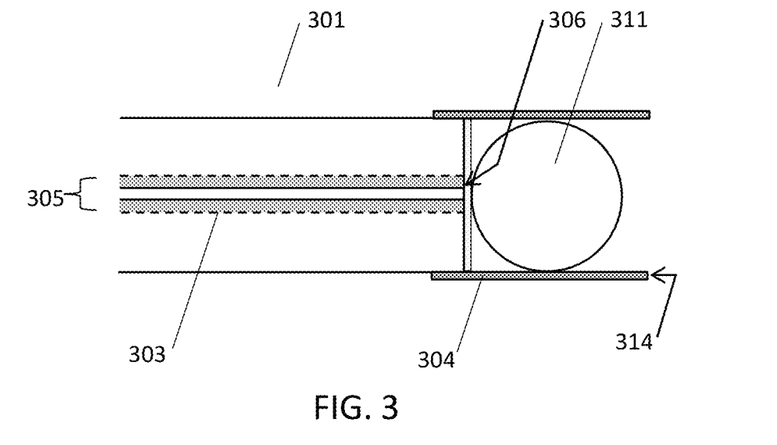
FIG. 3 illustrates an optical fiber connector (301) having a positive lens (311) wherein the end face of the optical fiber (206) and the positive lens are in contact.

10. An optical fiber connector (301) according to Example 8 wherein the positive lens (311) is in contact with the end face (306) of the optical fiber (305).

11th EXAMPLE

11. An optical fiber connector (301) according to Example 8 wherein the end face (6) of the optical fiber and positive lens (211) are separated by a region of optical index matching material having a refractive index within 10% of the refractive index of either the core of the optical fiber or of the positive lens.

12th EXAMPLE

12. An optical fiber connector according to Example 1 wherein the alignment sleeve (4) extends coaxially with the bore (3) beyond the axial extent of the end face (6) of the optical fiber (5) in a direction away from the optical fiber (5).

13th EXAMPLE

13. An optical fiber connector according to Example 8 wherein the alignment sleeve (204, 304) extends coaxially with the bore (203, 303) beyond the axial extent of the positive lens (211) in a direction away from the optical fiber (5).

14th EXAMPLE

14. An optical fiber connector (1, 201, 301) according to any previous Example wherein the alignment sleeve (4, 204, 304) has a distal end that is furthest from the optical fiber; wherein the distal end of the alignment sleeve (4, 204, 304) further comprises a stop flange (14, 214, 314); wherein the stop flange is arranged coaxially with the bore; and wherein the stop flange has an end face that lies in a perpendicular plane to the longitudinal axis of the bore.

15th EXAMPLE

Figure 4:
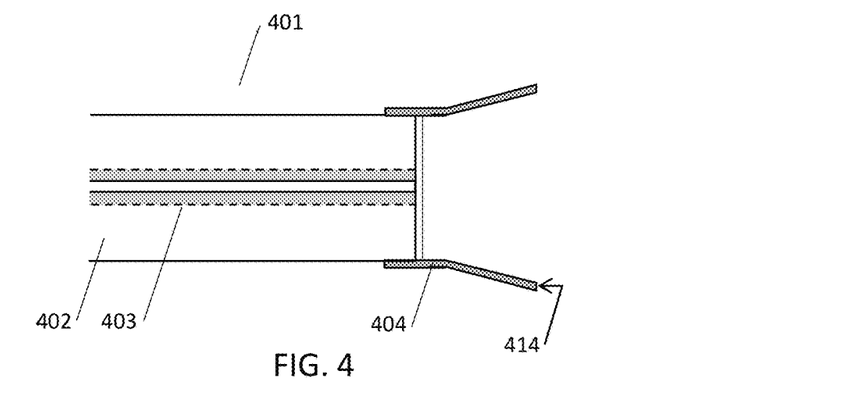
FIG. 4 illustrates an optical fiber connector (401) having a tapered alignment sleeve (414).
Figure 5:
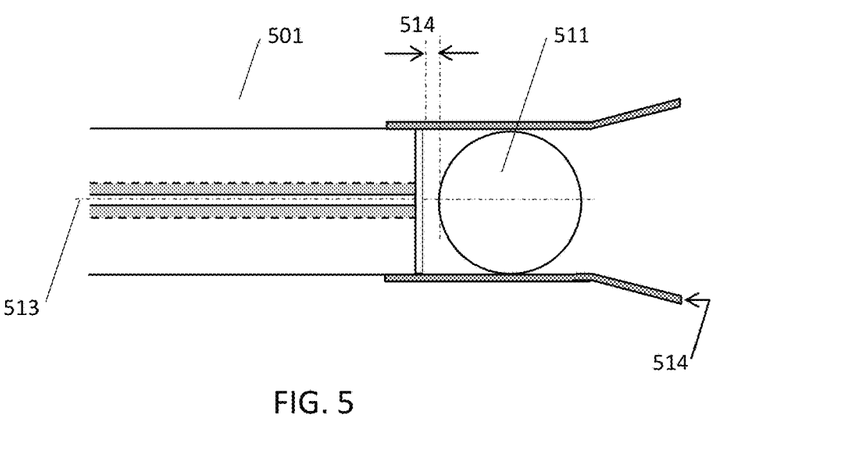
FIG. 5 illustrates an optical fiber connector (501) having a tapered alignment sleeve (514)and a positive lens (511) wherein there is a gap (514) between the end face of the optical fiber and the positive lens.
Figure 6:
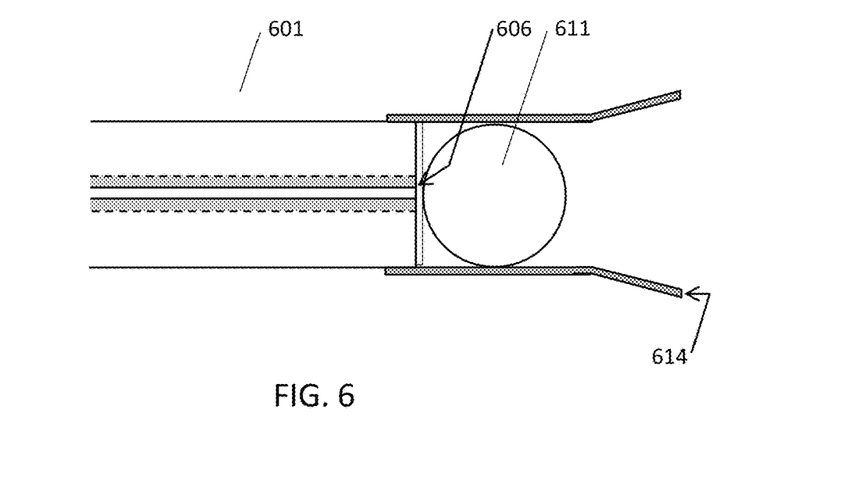
FIG. 6 illustrates an optical fiber connector (601) having a positive lens (611) wherein the end face of the optical fiber (606) and the positive lens are in contact.

15. An optical fiber connector according to any previous Example wherein the alignment sleeve (414, 514, 614) is tapered.

16TH EXAMPLE

Figure 7:
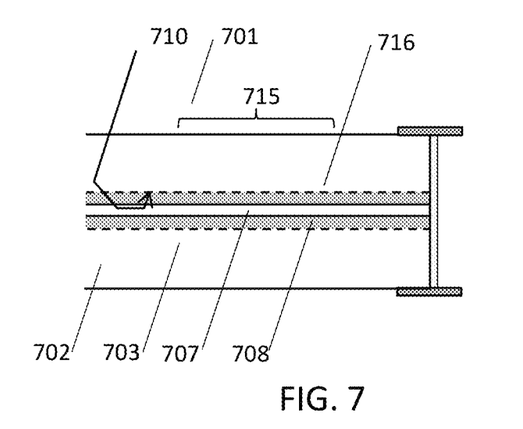
FIG. 7 illustrates an optical fiber connector (701) wherein for at least a portion (715) of the axial extent of the bore (703) the buffer layer (709) is removed and the cladding layer (708) is in optical contact with the body (702) via an optical medium (716).
Figure 8:
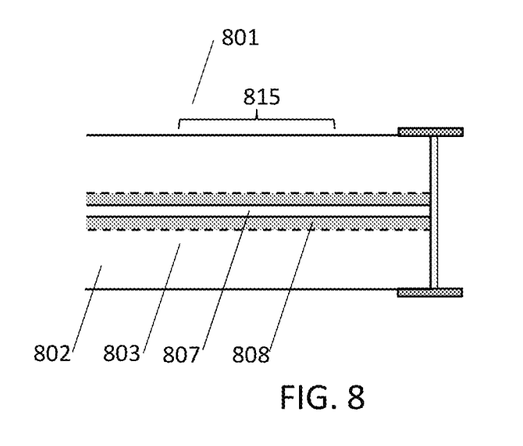
FIG. 8 illustrates an optical fiber connector (801) wherein for at least a portion (815) of the axial extent of the bore (803) the buffer layer (809) is removed and the cladding layer (808) is in contact with the body (802)

16. An optical fiber connector (701, 801) according to any previous Example wherein for at least a portion (715, 815) of the axial extent of the bore the buffer layer (709, 809) is removed; and wherein for that portion (715, 815) either the cladding layer (708) is in optical contact with the body (702) via an optical medium (716) having a real part of refractive index that is greater than or equal to the refractive index of the cladding layer (708);or the cladding layer (808) is in contact with the body (802) and the body (802) is formed from a material having a real part of refractive index that is greater than or equal to the refractive index of the cladding layer (808).

17th EXAMPLE

17. An optical fiber connector (701, 801) according to Example 16 wherein the optical medium (716) is an adhesive layer or a gel layer or an optical grease layer; and/or the body is formed from polyimide.

18th EXAMPLE

18. An optical fiber connector (701, 801) according to Example 17 wherein at least one of the optical medium (716) or the polyimide further includes a plurality of scattering centers having a volume diameter in the range of 0.1 to 1.0 microns.

19th EXAMPLE

Figure 9:
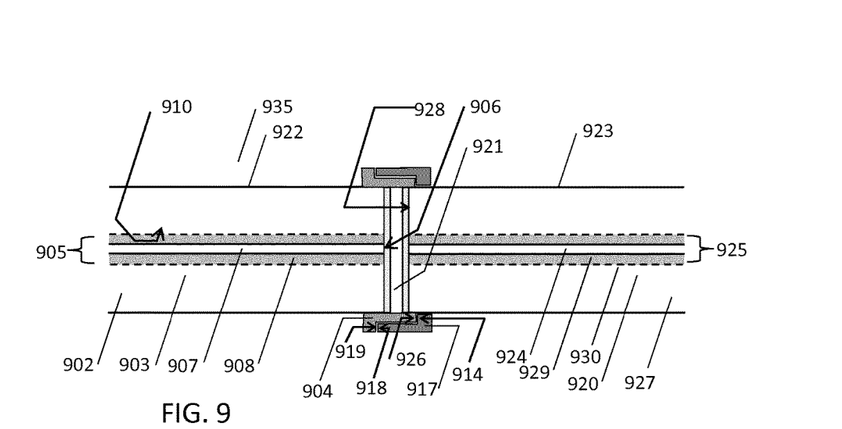
FIG. 9 illustrates an optical fiber connector assembly (935) comprising a first optical fiber connector (922) that is mated with a corresponding second optical fiber connector (923)

19. An optical fiber connector assembly (935) comprising a first optical fiber connector (922) according to Example 1 mated with a corresponding second optical fiber connector (923) according to Example 1; wherein the body (902) of the first optical fiber connector (922) corresponds with a counterpart body (927) of the second optical fiber connector (923) having a counterpart bore (920) that is configured to receive a counterpart optical fiber (925);

wherein the alignment sleeve (904) of the first optical fiber connector (922) corresponds with a counterpart alignment sleeve (917) of the second optical fiber connector (923) that is arranged coaxially with the counterpart bore (920); and wherein the optical fiber (905) of the of the first optical fiber connector (922) corresponds with a counterpart optical fiber (925) of the second optical fiber connector (923) having a counterpart end face (928) and a counterpart core (924) that is surrounded by a counterpart cladding layer (929); wherein the counterpart cladding layer (929) is surrounded by a counterpart buffer layer (930);

and wherein the counterpart optical fiber (925) is arranged within the counterpart bore (920) of the second optical fiber connector (923);

and wherein at least at the counterpart end face (928) the counterpart buffer layer (930) of the counterpart optical fiber (925) surrounds the counterpart cladding layer (929); and wherein the core (907) of the optical fiber (905) of the first optical fiber connector (922) is arranged coaxially with the counterpart core (924) of the counterpart optical fiber (925) in the second optical fiber connector (923).

20th EXAMPLE

20. An optical fiber connector assembly (935) according to Example 19 wherein:

the optical fiber (905) of the first optical fiber connector (922) has a core diameter D1 and a Numerical Aperture NA1; and wherein the counterpart optical fiber (925) of the second optical fiber connector (923) has a core diameter D2 and a Numerical Aperture NA2;

wherein at least one of the ratio (D1/D2) or the ratio (NA1/NA2) either exceeds 1.1 or is less than 1.1.

21st EXAMPLE

21. An optical fiber connector assembly (935) according to Example 19 or Example 20 wherein the end face (906) of the optical fiber (905) in the first optical fiber connector (922) is in contact with the end face (928) of the counterpart optical fiber (925) in the second optical fiber connector (923).

22$^{nd}$ EXAMPLE

22. An optical fiber connector assembly (935) according to Example 19; wherein the alignment sleeve (904) of the first optical fiber connector (922) extends axially beyond and away from the optical fiber (905) within its bore (903) and further includes a stop flange (914) and a radial stop flange (918); wherein the stop flange (914) of the first optical fiber connector (922) comprises the end face of its alignment sleeve (904) that is furthermost from the optical fiber (905) within its bore (903) and which stop flange (914) lies in a plane that is perpendicular to the longitudinal axis of the bore (903) of the first optical fiber connector (922); and wherein the radial stop flange (918) of the first optical fiber connector (922) is arranged coaxially with the bore (903) of the first optical fiber connector (922) and which radial stop flange (918) lies in a plane that is both perpendicular to the longitudinal axis of the bore (903) of the first optical fiber connector (922) and which intersects the bore (903) of the first optical fiber connector (922); and wherein the counterpart alignment sleeve (917) of the second optical fiber connector (923) extends axially beyond and away from the counterpart optical fiber (925) within its bore (920) and further includes a counterpart stop flange (919) and a counterpart radial stop flange (926); wherein the counterpart stop flange (919) of the second optical fiber connector (923) comprises the end face of its alignment sleeve (917) that is furthermost from the counterpart optical fiber (925) within its bore (920) and which counterpart stop flange (919) lies in a plane that is perpendicular to the longitudinal axis of the counterpart bore (920) of the second optical fiber connector (923); and wherein the counterpart radial stop flange (926) of the second optical fiber connector (923) is arranged coaxially with the counterpart bore (920) of the second optical fiber connector (923) and which counterpart radial stop flange (926) lies in a plane that is both perpendicular to the longitudinal axis of the counterpart bore (920) of the second optical fiber connector (923) and which intersects the counterpart bore (920) of the second optical fiber connector (923).

23$^{rd}$ EXAMPLE

23. An optical fiber connector assembly (935) according to Example 22 wherein the axial positions of the stop flange (914) and the radial stop flange (918) of the first optical fiber connector (922), and the axial positions of the counterpart stop flange (919) and the counterpart radial stop flange (926) of the second optical fiber connector (923), respective the common axis shared by the core (907) of the optical fiber (905) in the first optical fiber connector (922) and the counterpart optical fiber (925) in the second optical fiber connector (923) are configured to leave a gap (921) between the mutually opposing end faces (906, 928) of the two optical fibers (905, 925).

24$^{th}$ EXAMPLE

24. An optical fiber connector assembly according to Example 22 wherein the gap (921) is filled with a gel layer or an optical grease layer having a refractive index within 10% of the refractive index of the core (907, 924) of at least one of the two optical fibers (905, 925).

25$^{th}$ EXAMPLE

Figure 10:
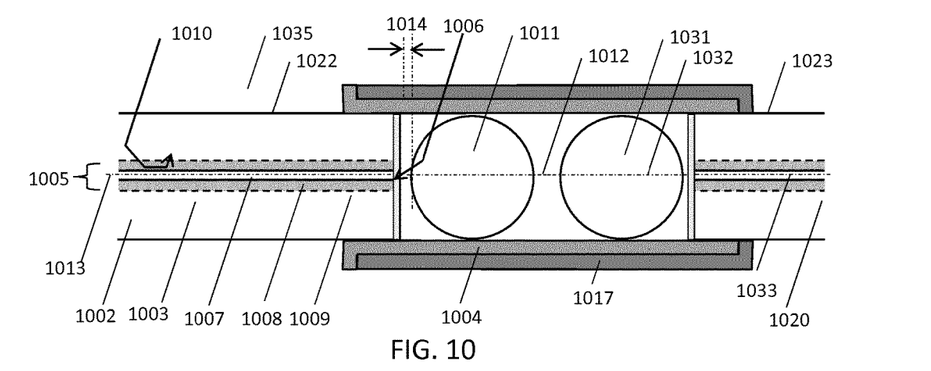
FIG. 10 illustrates an optical fiber connector assembly (1035) having a first optical fiber connector (1022) that includes a positive lens (1011) and a second optical fiber connector (1023) that includes a corresponding counterpart positive lens (1031)

25. An optical fiber connector assembly according to any one of Examples 19-22 wherein the first optical fiber connector (1022) further includes a positive lens (1011) that is arranged within its alignment sleeve (1004); wherein the optical axis (1012) of the positive lens (1011) is aligned coaxially with the axis (1013) of the bore (1003) of the first optical fiber connector (1022); and wherein the second optical fiber connector (1023) further includes a corresponding counterpart positive lens (1031) that is arranged within its alignment sleeve (1017); wherein the optical axis (1032) of the counterpart positive lens (1031) is aligned coaxially with the axis (1033) of the counterpart bore (1020) of the second optical fiber connector (1023).

26$^{th}$ EXAMPLE

Figure 11:
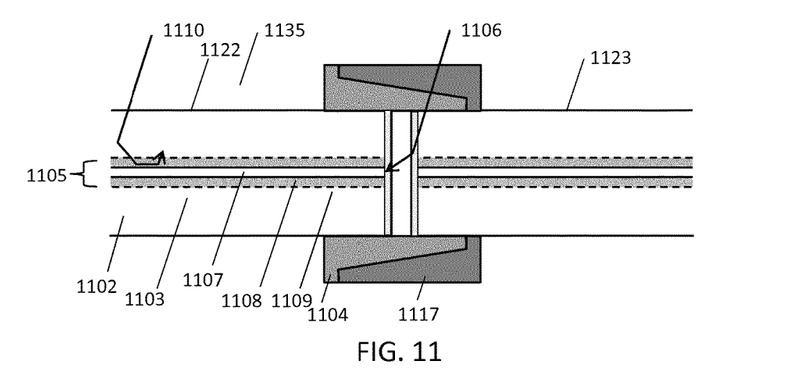
FIG. 11 illustrates an optical fiber connector assembly (1135) wherein a first optical fiber connector (1122) and a second optical fiber connector (1123) each have a tapered alignment sleeve (1104, 1117) wherein the alignment sleeve (1104) of the first optical fiber connector (1122) has an outer diameter that is configured to fit within the inner diameter of the counterpart alignment sleeve (1117) of the second optical fiber connector (1123).

26. An optical fiber connector assembly (935, 1035, 1135) according to Example 19 wherein the alignment sleeve (904, 1004, 1104) of the first optical fiber connector (922, 1022, 1122) has an outer diameter that is configured to fit within the inner diameter of the counterpart alignment sleeve (917, 1017, 1117) of the second optical fiber connector (923, 1023, 1123).

27$^{th}$ EXAMPLE

27. An optical fiber connector assembly (935) according to Example 19 wherein each of the alignment sleeve (904) of the first optical fiber connector (922) and the corresponding counterpart alignment sleeve (917) of the second optical fiber connector (923) has a cross section in a plane that is perpendicular to its bore (903, 920) that is non-rotationally symmetric about its bore (903, 920).

28$^{th}$ EXAMPLE

Figure 12:
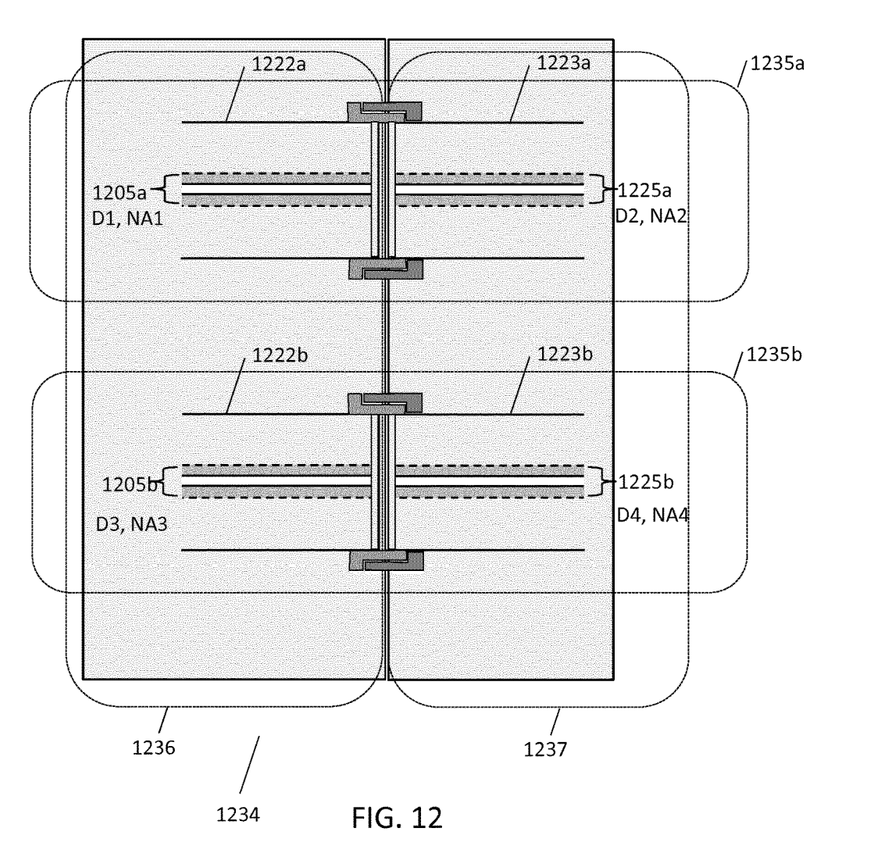
FIG. 12 illustrates an optical fiber connector housing (1234) comprising two optical fiber connector assemblies (1235a, 1235b).
Figure 13:
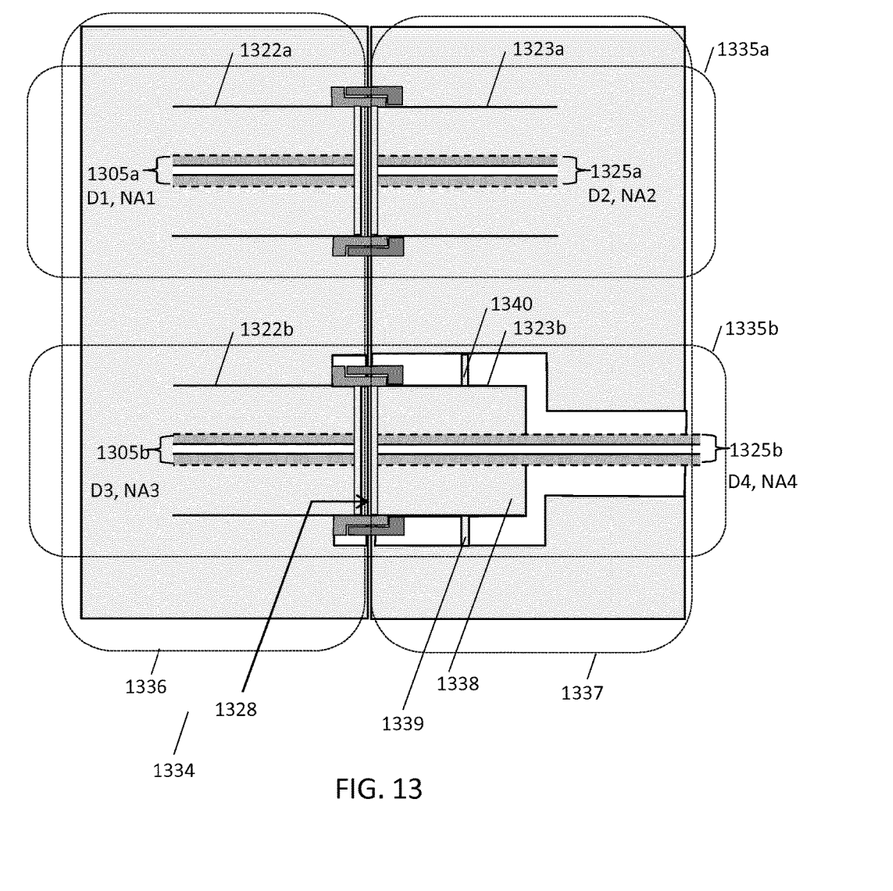
FIG. 13 illustrates an optical fiber connector housing (1334) wherein at least a portion (1338) of the body surrounding a counterpart optical fiber (1325b) in the socket (1337) housing is elastically coupled (1339, 1340) to the socket housing (1337) for providing an elastic force along the axis of the counterpart optical fiber (1325b) in a direction away from the end face (1328) of the counterpart optical fiber (1325b) and wherein each optical fiber (1305a, 1305b) in the plug housing (1336) is rigidly mechanically coupled to the plug housing (1336).

28. An optical fiber connector housing (1234, 1334) comprising two or more optical fiber connector assemblies (1235a, 1235b) according to Example 19; wherein every first optical fiber connector (1205a, 1205b) is retained within a plug housing (1236), and wherein every second optical fiber connector (1225a, 1225b) is retained within a socket housing (1237); and wherein one of the optical fiber connector assemblies (1235a) has an optical fiber (1205a) with a core diameter D1 and a Numerical Aperture NA1 and a counterpart optical fiber (1225a) with a core diameter D2 and a Numerical Aperture NA2; and the second and further optical fiber connector assemblies (1222b, 1223b) each have an optical fiber (1205b) with a core diameter D3 and a Numerical Aperture NA3 and a counterpart optical fiber (1225b) with a core diameter D4 and a Numerical Aperture NA4; wherein at least one of the ratio (D1/D2) or the ratio (NA1/NA2) either exceeds 1.1 or is less than 1.1; and wherein at least one of the ratio (D3/D4) or the ratio (NA3/NA4) lies within the range 0.9 to 1.1.

29$^{th}$ EXAMPLE

29. An optical fiber connector housing (1334) according to Example 28 wherein at least a portion (1338) of the body surrounding each counterpart optical fiber in the socket housing is elastically coupled (1339, 1340) to the socket housing (1337) for providing an elastic force along the axis of the counterpart optical fiber (1325b) in the direction away from the end face (1328) of the counterpart optical fiber and wherein each optical fiber (1305a, 1305b) in the plug housing is rigidly mechanically coupled to the plug housing (1336).

30th EXAMPLE

30. An optical fiber connector housing (1334) according to Example 28 further comprising an alignment feature having a male portion and a corresponding female portion; wherein the male portion of the alignment feature is a protrusion that is fixably mounted to an alignment sleeve of the first optical fiber connector in the plug housing; and wherein the female portion of the alignment feature is a groove that corresponds with the protrusion and which is fixably mounted to a counterpart alignment sleeve of a corresponding second optical fiber connector in the socket housing; wherein the male portion and the female portion are coincident when the two or more optical fiber connector assemblies are mated.

31st EXAMPLE

31. An optical fiber connector assembly or an optical fiber connector housing according to any one of Examples 19-30 further comprising a locking mechanism for temporarily fixing the relative axial positions of at least the optical fiber and the counterpart optical fiber; wherein a male portion of the locking mechanism is fixably attached to a first optical fiber connector and wherein a corresponding female portion of the locking mechanism is fixably attached to a second optical fiber connector; wherein the male portion of the locking mechanism and the female portion of the locking mechanism are in a locked state when the optical fiber and the counterpart optical fiber are mated; and wherein the locking mechanism is selected from the group: a screw connector, a twist-lock connector, a snap connector, a bayonet connector.

32nd EXAMPLE

32. A medical optical spectroscopy device comprising the optical fiber connector of Example 1 or the optical fiber connector assembly of Example 19.

33Rd EXAMPLE

33. A method of manufacturing an optical fiber connector of any previous Example comprising the steps of:
inserting an optical fiber having a core that is surrounded by a cladding layer and which is surrounded by a buffer layer within a body mould comprising a fixed volume that is bounded by two end faces such that the optical fiber extends through both end faces;
moulding a plastic body axially along the length of the optical fiber between the two end faces of the body mould; wherein for at least the portion of the optical fiber between the two end faces of the body mould the buffer layer of the optical fiber surrounds the cladding layer;
cleaving the optical fiber beyond the end face of the body mould;
polishing the end face of the cleaved optical fiber;
removing the optical fiber from the body mould.

34th EXAMPLE

34. Use of the optical fiber connector of Example 1 in a medical optical spectroscopy device.

35th EXAMPLE

35. An optical arrangement for confirming the presence of the optical fiber connector of Example 1 at a first end of an optical fiber; the validation arrangement comprising: an optical source configured to couple light into either the first end or a second end of the optical fiber of Example 1; and an optical detector configured to receive light that is reflected or emitted by the optical signature component of Example 1.

36th EXAMPLE

36. An optical arrangement according to Example 35 wherein the optical source is a fiber-coupled optical source that is terminated in an optical fiber connector that is configured to mate with the alignment sleeve of the optical fiber connector of Example 1; and wherein the optical detector is a fiber coupled optical detector configured to detect light returning from the optical signature component by means of the optical fiber that is coupled to the optical source.

37th EXAMPLE

37. A method of associating an optical fiber connector type to the optical fiber connector of Example 1; the method comprising the steps of: irradiating the optical signature component of Example 1 using the optical source of the optical arrangement of Example 35; receiving optical light reflected or emitted by the optical signature component of Example 1; determining, based on the spectrum and intensity of the received optical light and a look-up table having an association between a plurality of connector types and a plurality of predetermined spectral signatures; the presence of an associated connector type from the plurality of optical fiber connector types in the look-up table.

38th EXAMPLE

38. The method of Example 37 further comprising the steps of: assigning an associated connector type to the optical fiber connector.

39th EXAMPLE

Figure 14:
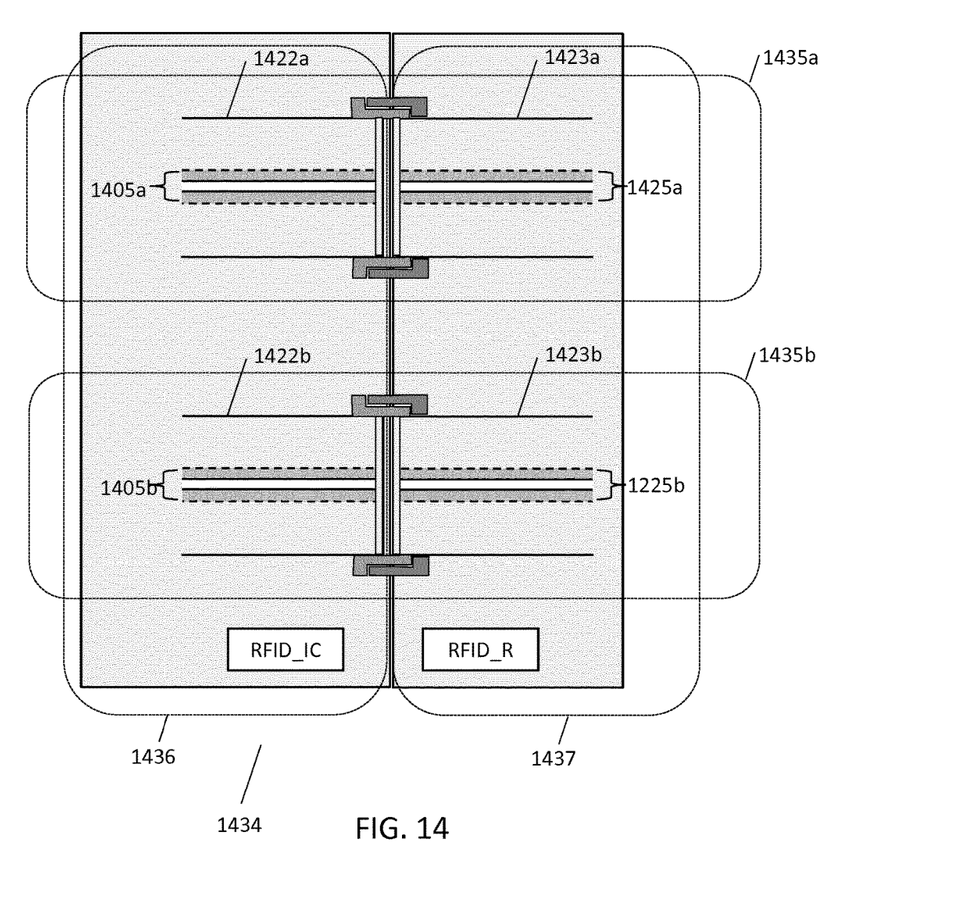
FIG. 14 illustrates an optical fiber connector arrangement (1434) that includes an optical fiber connector plug housing (1436) having an RFID (Radio Frequency IDentification) integrated circuit (IC) and an optical fiber connector socket housing (1437) having an RFID reading circuit.

39. In another example illustrated in FIG. 14 an optical fiber connector arrangement (1434) includes an optical fiber connector plug housing (1436) having an RFID (Radio Frequency IDentification) integrated circuit (IC), and an optical fiber connector socket housing (1437) having an RFID reading circuit. The reading circuit may include electrical connections to a console for electrically communicating the data read by the RFID reading circuit. The RFID IC may for example store the identity of the connector type, and optionally additional data such as data relating to the optical transfer characteristics of an optical component such as an optical needle that is optically connected to the connector.

To summarize, an optical fiber connector for interconnecting optical fibers has been disclosed with reference to an exemplary application of delivering light and performing optical measurements at the tip of a needle in a medical device. The optical fiber connector includes an optical signature component having a predetermined optical signature which permits the identity of the optical fiber connector to be verified. Various aspects of the connector, including its incorporation in an assembly and in a housing have been described.

Whilst the invention has been illustrated and described in detail in the drawings and foregoing description, such illustrations and description are to be considered illustrative or exemplary and not restrictive; the invention is not limited to the disclosed embodiments and can be used for optically connecting optical fibers in various applications both in and beyond the medical field.

The invention claimed is:

1. An optical fiber connector comprising:
  a body having a bore configured to receive an optical fiber;
  an optical fiber having an end face and a core surrounded by a cladding layer, wherein the cladding layer is surrounded by a buffer layer for at least a portion of an axial extent of the optical fiber; and wherein the optical fiber is arranged within the bore;
  wherein a distal end of the optical fiber connector includes an optical signature component having a predetermined optical signature indicative of an optical fiber connector type;
  wherein for at least a portion of the axial extent of the bore the buffer layer is absent or removed from the cladding layer and for that portion the cladding layer is in optical contact with the optical signature component via an optical medium having a refractive index that is greater than or equal to the refractive index of the cladding layer for increasing the amount of leakage light from the cladding layer that is returned to the core via the optical signature component.

2. An optical fiber connector according to claim 1 further comprising an alignment sleeve that is arranged coaxially with the bore.

3. An optical fiber connector according to claim 1 wherein the optical fiber connector has an axis; the optical fiber connector further comprising an alignment sleeve; wherein the alignment sleeve is arranged coaxially with the optical fiber connector axis.

4. An optical fiber connector according to claim 1 wherein the optical signature is an optical reflectance signature or an optical fluorescence signature.

5. An optical fiber connector according to claim 1 wherein the optical signature component is disposed either i) on the end face- of the optical fiber, ii) at the end face of the optical fiber and beyond the radial extent of the optical fiber or iii) along at least a portion of the axial extent of the bore.

6. An optical fiber connector according to claim 5 wherein the optical medium is a portion of the body.

7. An optical fiber connector according to claim 6 wherein the optical signature component is either i) a reflective dye distributed in the body and the predetermined optical signature is an optical reflectance spectrum of the dye or ii) a fluorescent dye distributed in the body and the predetermined optical signature is an optical emission spectrum of the fluorescent dye.

8. An optical fiber connector according to claim 1 wherein the optical medium is a polymer layer that surrounds the cladding layer of the optical fiber.

9. An optical fiber connector according to claim 8 wherein the optical signature component is either i) a reflective dye distributed in the polymer layer and the predetermined optical signature is an optical reflectance spectrum of the dye or ii) a fluorescent dye distributed in the polymer layer and the predetermined optical signature is an optical emission spectrum of the fluorescent dye.

10. An optical fiber connector according to claim 7 wherein the fluorescent dye is a uv-excitable fluorescent dye having optical emission at visible wavelengths.

11. An optical fiber connector assembly comprising a first optical fiber connector according to claim 2 mated with a corresponding second optical fiber connector; wherein the body of the first optical fiber connector corresponds with a counterpart body of the second optical fiber connector having a counterpart bore that is configured to receive a counterpart optical fiber;
  wherein the alignment sleeve of the first optical fiber connector corresponds with a counterpart alignment sleeve of the second optical fiber connector that is arranged coaxially with the counterpart bore; and
  wherein the optical fiber of the of the first optical fiber connector corresponds with a counterpart optical fiber of the second optical fiber connector having a counterpart end face and a counterpart core that is surrounded by a counterpart cladding layer; wherein the counterpart cladding layer is surrounded by a counterpart buffer layer;
  and wherein the counterpart optical fiber is arranged within the counterpart bore of the second optical fiber connector;
  and wherein at least at the counterpart end face the counterpart buffer layer of the counterpart optical fiber surrounds the counterpart cladding layer; and
  wherein the core of the optical fiber of the first optical fiber connector is arranged coaxially with the counterpart core of the counterpart optical fiber in the second optical fiber connector.

12. An optical fiber connector housing comprising two or more optical fiber connector assemblies according to claim 11; wherein every first optical fiber connector is retained within a plug housing, and wherein every second optical fiber connector is retained within a socket housing; and wherein one of the optical fiber connector assemblies has an optical fiber with a core diameter D1 and a Numerical Aperture NA1 and a counterpart optical fiber with a core diameter D2 and a Numerical Aperture NA2; and the second and further optical fiber connector assemblies each have an optical fiber with a core diameter D3 and a Numerical Aperture NA3 and a counterpart optical fiber with a core diameter D4 and a Numerical Aperture NA4; wherein at least one of a ratio (D1/D2) or a ratio (NA1/NA2) either exceeds 1.1 or is less than 1.1; and wherein at least one of a ratio (D3/D4) or a ratio (NA3/NA4) lies within the range 0.9 to 1.1.

13. An optical arrangement for confirming a presence of the optical fiber connector of claim 1 at a first end of an optical fiber; the optical arrangement comprising: the optical fiber connector; an optical source configured to couple light into either the first end or a second end of the optical fiber; and an optical detector configured to receive light that is reflected or emitted by the optical signature component.

14. A method of associating an optical fiber connector type to the optical fiber connector of claim 1; the method comprising the steps of: irradiating the optical signature component with an optical source of the optical arrangement receiving optical light reflected or emitted by the optical signature component; determining, based on a spectrum and intensity of the received optical light and a look-up table having an association between a plurality of connector types and a plurality of predetermined spectral signatures; a presence of an associated connector type from the plurality of optical fiber connector types in the look-up table.

15. The method of claim 14 further comprising the step of assigning an associated connector type to the optical fiber connector.

* * * * *